US012731232B2

(12) United States Patent
Zhou et al.

(10) Patent No.: US 12,731,232 B2
(45) Date of Patent: Sep. 8, 2026

(54) CHROMATIC ABERRATION CORRECTION FOR FOVEATED DISPLAY

(71) Applicant: Apple Inc., Cupertino, CA (US)

(72) Inventors: Jian Zhou, Pleasanton, CA (US); Jeffrey J Irwin, Cupertino, CA (US); Jim C Chou, San Jose, CA (US); Miles Simpson, El Dorado Hills, CA (US)

(73) Assignee: Apple Inc., Cupertino, CA (US)

( * ) Notice: Subject to any disclaimer, the term of this patent is extended or adjusted under 35 U.S.C. 154(b) by 601 days.

(21) Appl. No.: 18/328,605

(22) Filed: Jun. 2, 2023

(65) Prior Publication Data

US 2024/0404028 A1 Dec. 5, 2024

(51) Int. Cl.

*G06T 3/04* (2024.01)
*G06T 3/18* (2024.01)
*G06T 5/80* (2024.01)
*G06T 7/11* (2017.01)

(52) U.S. Cl.

CPC .................. *G06T 5/80* (2024.01); *G06T 7/11* (2017.01); *G06T 2207/10024* (2013.01)

(58) Field of Classification Search

None

See application file for complete search history.

(56) References Cited

U.S. PATENT DOCUMENTS 11,227,558 B1 1/2022 Lin et al.
2006/0238649 A1 10/2006 Elliott et al.
2009/0102855 A1 4/2009 Elliott et al.
2011/0199534 A1 8/2011 Kawai
2013/0010163 A1* 1/2013 Yamaguchi .......... H04N 23/843 382/167
2014/0035971 A1 2/2014 Elliott et al.
2015/0296193 A1* 10/2015 Cote ..................... G06T 3/4015 382/167
2019/0080656 A1 3/2019 Herranz et al.
2020/0145631 A1* 5/2020 Taoka .................... H04N 9/646
2021/0142443 A1* 5/2021 Eble .......................... G06T 3/40
2021/0321065 A1 10/2021 Wu et al.
2022/0414841 A1 12/2022 Chou et al.

(Continued)

FOREIGN PATENT DOCUMENTS

JP H11298924 * 10/1999 ............. G02B 27/02

OTHER PUBLICATIONS

T.E. Boult, et al., "Correcting chromatic aberrations using image warping," Proceedings 1992 IEEE Computer Society Conference on Computer Vision and Pattern Recognition, Champaign, IL, USA, 1992, pp. 684-687, doi: 10.1109/CVPR.1992.223201.

(Continued)

*Primary Examiner* — Beniyam Menberu
(74) *Attorney, Agent, or Firm* — Fletcher Yoder, P.C.

(57) ABSTRACT

An electronic device uses a chromatic aberrations correction (CAC) circuit to correct chromatic aberration on a display panel. An input image is warped based on a first color channel only geometric distortions associated with displaying the input image on the display panel. The CAC circuit applies spatial resampling to other color channels to compensate chromatic aberration based on distortion offsets between the other color channels and the first color channel

20 Claims, 12 Drawing Sheets

(56) References Cited

U.S. PATENT DOCUMENTS

| | | | | |
|---|---|---|---|---|
| 2023/0138779 | A1* | 5/2023 | Liu | G06T 5/50 382/275 |
| 2024/0233098 | A1* | 7/2024 | Xiong | G06T 5/80 |
| 2025/0328995 | A1* | 10/2025 | Schwalb | G06T 7/13 |

OTHER PUBLICATIONS

L. Fang, et al., “Subpixel-Based Image Down-Sampling With Min-Max Directional Error for Stripe Display,” IEEE Journal of Selected Topics in Signal Processing, vol. 5, No. 2, pp. 240-251, Apr. 2011, doi: 10.1109/JSTSP.2010.2053346.

* cited by examiner

CHROMATIC ABERRATION CORRECTION FOR FOVEATED DISPLAY

BACKGROUND

The present disclosure relates generally to displayed image processing and, more particularly, to chromatic aberration correction (CAC) in a foveated electronic display.

Electronic displays are found in numerous electronic devices, such as mobile phones, computers, televisions, automobile dashboards, and augmented reality or virtual reality glasses, to name just a few. Electronic displays control the amount of light emitted from their display pixels based on corresponding image data to produce images. Processing circuitry of the electronic device may generate or retrieve the image data that may be used to program the display pixels of the electronic display to display an image. In some scenarios, the image to be displayed may appear distorted when perceived by a viewer due to environmental effects, properties of the display, the viewer's point-of-view (POV), image processing alterations such as shifts and scaling, and/or other distorting factors. For example, if the electronic display includes a screen or a filter with curved edges and/or lensing effects, distortion such as lateral chromatic aberration may occur.

SUMMARY

Before being displayed, the image data may be processed to warp the image using the desired changes to the amount (e.g., resolution) or distribution (e.g., shape, relative size, perspective) of pixel values such that the perceived image is not distorted. This disclosure provides systems and methods for using a chromatic aberration correction (CAC) block to perform correction to compensate for lateral chromatic aberrations. Chromatic aberrations are color-dependent distortions; therefore, the distortions may be different for different color channels (e.g., red channel, green channel, blue channel). The image processing circuitry may include a CAC block, and the input signals to the CAC block may be pre-warped in frontend warp pipes based on a geometric distortion applied to a single first color channel (e.g., green channel). The CAC block may apply spatial resampling to other color channels (e.g., red and blue channels) to compensate for chromatic aberration based on distortion offsets (e.g., vertical offsets, horizontal offsets) between the other color channels (e.g., red and blue channels) and the first color channel (e.g., green channel). Multiple warped color channels of image data may be blended into a single data path. The corrected image data for all color channels may be combined together and output for display.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
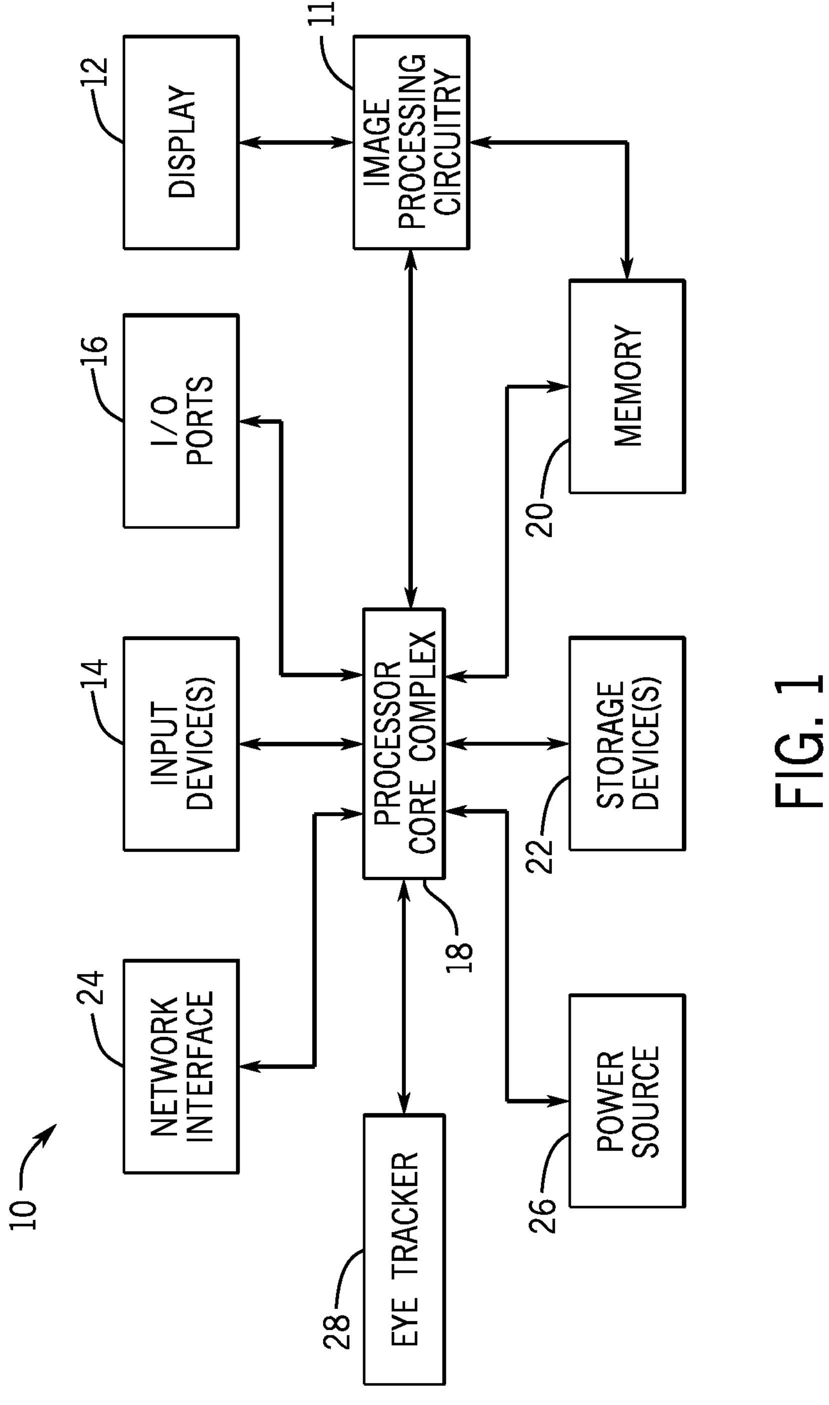
FIG. 1 is a block diagram of an electronic device, according to an embodiment of the present disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment", "an embodiment", or "some embodiments" of the present disclosure are not intended to be interpreted as excluding the existence of additional embodiments that also incorporate the recited features. Use of the term "approximately" or "near" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on). Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

Electronic devices often use one or more electronic displays to present visual information such as text, still images, and/or video by displaying one or more images. To display an image, an electronic display may control light emission of its display pixels based at least in part on corresponding image data. The image data may be processed to account for distortions due to different display scenarios and/or input image characteristics before the image data being displayed. Image processing circuitry may warp one or more sets of input image data to account for input distortions (e.g., camera lens distortion), output distortions (e.g., lensing effects associated with the physical shape of the display panel and/or glass cover thereof, lensing effects associated with the light emission mechanism of the display (e.g., liquid crystal displays (LCDs), digital micromirror devices (DMD), organic light-emitting diodes (OLEDs), micro-light-emitting diodes (micro-LEDs)), processing distortions (e.g., a POV change, shifts, scaling, foveation related resolution changes, etc.) and/or to achieve a common image space for blending. For example, lateral chromatic aberration may occur on some curved electronic displays and/or curved glass covers or filters on the electronic displays, and the lateral chromatic aberration may be color dependent.

This disclosure provides image processing systems and methods to correct color dependent distortions by using a chromatic aberration correction (CAC) block. The image processing circuitry may utilize the chromatic aberration correction (CAC) block to perform correction to compensate for lateral chromatic aberrations. In particular, the input signals to the CAC block may be pre-warped in frontend warp pipes based on a first color channel (e.g., green channel) only geometric distortion. The CAC block may apply spatial resampling to other color channels (e.g., red and blue channels) to compensate for chromatic aberration based on distortion differences between the other color channels (e.g., red and blue channels) and the first color channel (e.g., green channel). Multiple warped color channels of image data may be blended into a single data path. The corrected image data for all color channels may be combined together and output for display.

For example, the image processing circuitry may utilize configuration data associated with the desired warp effects for the first color channel (e.g., green channel) to generate a mapping from the input image space to the warped image space. Based on the configuration data, a mapping may be determined correlating the output pixel values of warped image data to pixel values of the input image data. Distortion differences, or distortion offsets (e.g., vertical offsets, horizontal offsets), between the other color channels (e.g., red and blue channels) and the first color channel (e.g., green channel) in the output image space may be converted to the input image space using a reverse of the mapping. The CAC may utilize the offsets between the other color channels (e.g., red and blue channels) and the first color channel (e.g., green channel) in the input image space to apply spatial resampling to other color channels (e.g., red and blue channels) of the input signals. As should be appreciated, the output image space may be associated with the physical pixel locations of the display panel (e.g., the display image space) or any desired image space. Moreover, the image processing circuitry may fetch the input image data (e.g., from memory) and, utilizing the mapping, generate an output pixel value based on the input image data. Furthermore, in some embodiments, the output pixel value may be interpolated from a set of multiple input pixel values selected based on the mapping. The image data for all corrected color channels in the warped image space may be combined together and output for display.

Moreover, certain electronic displays, known as "foveated" displays, display images at higher resolution where a viewer is looking and at lower resolution in the peripheral vision of the viewer. The image data for foveated displays thus may have some pixels that are grouped together to display the same image data. This is referred to as "grouped space," whereas the electronic display itself has numerous individual pixels that may be considered to have an "ungrouped space." For foveated displays, both the input and output of the CAC block are in the grouped space, and pixels may be directly resampled from the grouped space to the grouped space before being displayed in the ungrouped space.

Furthermore, the warped image data may include static and/or dynamic aspects to account for warp characteristics that do not change (e.g., display geometry) and things that do (e.g., POV changes, shifts, scaling, foveation related resolution changes). For example, when operating in multiple resolutions, such as for a foveated display that displays multiple different resolutions of an image at different locations on the electronic display depending on a viewer's gaze or focal point on the display, viewer's POV may change and content displayed in different locations as well as sizes, resolutions, or/and positions of the different locations may also change. In other words, which input pixels map to which output pixel positions on the display panel (e.g., as achieved by warping the input image data) may change based on parameters, algorithms, mappings, etc. that are captured in the configuration data. For instance, the dynamic part of the distortions, e.g., the warp characteristics that change (e.g., POV changes, shifts, scaling, foveation related resolution changes), may be decoupled from the rest of the distortions and be processed separately. For example, the image data may be pre-warped in frontend warp pipes based on a geometric distortion correction for a first color channel (e.g., green channel). The CAC block may apply spatial resampling to other color channels (e.g., red and blue channels) in relation to the first color channel (e.g., green color channel) to compensate the dynamic part of the chromatic aberration based on distortion differences between the other color channels (e.g., red and blue channels) and the first color channel (e.g., green channel) in the ungrouped space (e.g., display panel space). The compensated image data may be converted to the grouped space by pixel grouping. The dynamic chromatic aberration correction may be applied for per-frame updates.

The image processing circuitry may include separate warp hardware (e.g., for parallel processing) and/or perform separate warp operations using the same hardware for different sets of input image data. For example, the image processing circuitry (e.g., a warp block) may utilize configuration data associated with the desired warp effects to generate a mapping from the input image data to the warped image data. The configuration data may include or define mappings, algorithms, and/or parameters indicative of the warp to be accomplished for a set of input image data. The image processing circuitry may fetch the input image data (e.g., from memory) and, utilizing the mapping, generate an output pixel value based on the input image data. Furthermore, in some embodiments, the output pixel value may be interpolated from a set of multiple input pixel values selected based on the mapping.

With the preceding in mind and to help illustrate, an electronic device 10 including an electronic display 12 is shown in FIG. 1. As is described in more detail below, the electronic device 10 may be any suitable electronic device, such as a computer, a mobile phone, a portable media device, a tablet, a television, a virtual-reality headset, a wearable device such as a watch, a vehicle dashboard, or the like. Thus, it should be noted that FIG. 1 is merely one example of a particular implementation and is intended to illustrate the types of components that may be present in an electronic device 10.

The electronic device 10 includes the electronic display 12, image processing circuitry 11, one or more input devices 14, one or more input/output (I/O) ports 16, a processor core complex 18 having one or more processing circuitry(s) or processing circuitry cores, local memory 20, a main memory storage device 22, a network interface 24, a power source 26 (e.g., power supply), and eye tracker 28. The various components described in FIG. 1 may include hardware elements (e.g., circuitry), software elements (e.g., a tangible, non-transitory computer-readable medium storing executable instructions), or a combination of both hardware and software elements. It should be noted that the various depicted components may be combined into fewer components or separated into additional components. For example, the local memory 20 and the main memory storage device 22 may be included in a single component.

The processor core complex 18 is operably coupled with local memory 20 and the main memory storage device 22. Thus, the processor core complex 18 may execute instructions stored in local memory 20 or the main memory storage device 22 to perform operations, such as generating or transmitting image data to display on the electronic display 12. As such, the processor core complex 18 may include one or more general purpose microprocessors, one or more application specific integrated circuits (ASICs), one or more field programmable logic arrays (FPGAs), or any combination thereof.

In addition to program instructions, the local memory 20 or the main memory storage device 22 may store data to be processed by the processor core complex 18. Thus, the local memory 20 and/or the main memory storage device 22 may include one or more tangible, non-transitory, computer-readable media. For example, the local memory 20 may include random access memory (RAM) and the main memory storage device 22 may include read-only memory (ROM), rewritable non-volatile memory such as flash memory, hard drives, optical discs, or the like.

The network interface 24 may communicate data with another electronic device or a network. For example, the network interface 24 (e.g., a radio frequency system) may enable the electronic device 10 to communicatively couple to a personal area network (PAN), such as a Bluetooth network, a local area network (LAN), such as an 802.11× Wi-Fi network, or a wide area network (WAN), such as a 4G, Long-Term Evolution (LTE), or 5G cellular network. The power source 26 may provide electrical power to one or more components in the electronic device 10, such as the processor core complex 18 or the electronic display 12. Thus, the power source 26 may include any suitable source of energy, such as a rechargeable lithium polymer (Li-poly) battery or an alternating current (AC) power converter. The I/O ports 16 may enable the electronic device 10 to interface with other electronic devices. For example, when a portable storage device is connected, the I/O port 16 may enable the processor core complex 18 to communicate data with the portable storage device.

The input devices 14 may enable user interaction with the electronic device 10, for example, by receiving user inputs via a button, a keyboard, a mouse, a trackpad, a touch sensing, or the like. The input device 14 may include touch-sensing components (e.g., touch control circuitry, touch sensing circuitry) in the electronic display 12. The touch sensing components may receive user inputs by detecting occurrence or position of an object touching the surface of the electronic display 12.

In addition to enabling user inputs, the electronic display 12 may be a display panel with one or more display pixels. For example, the electronic display 12 may include a self-emissive pixel array having an array of one or more of self-emissive pixels or liquid crystal pixels. The electronic display 12 may include any suitable circuitry (e.g., display driver circuitry) to drive the self-emissive pixels, including for example row driver and/or column drivers (e.g., display drivers). Each of the self-emissive pixels may include any suitable light emitting element, such as an LED (e.g., an OLED or a micro-LED). However, any other suitable type of pixel, including non-self-emissive pixels (e.g., liquid crystal as used in liquid crystal displays (LCDs), digital micromirror devices (DMD) used in DMD displays) may also be used. The electronic display 12 may control light emission from the display pixels to present visual representations of information, such as a graphical user interface (GUI) of an operating system, an application interface, a still image, or video content, by displaying frames of image data. To display images, the electronic display 12 may include display pixels implemented on the display panel. The display pixels may represent sub-pixels that each control a luminance value of one color component (e.g., red, green, or blue for an RGB pixel arrangement or red, green, blue, or white for an RGBW arrangement).

The electronic display 12 may display an image by controlling pulse emission (e.g., light emission) from its display pixels based on pixel or image data associated with corresponding image pixels (e.g., points) in the image. Before being used to display a corresponding image on the electronic display 12, the image data may be processed via the image processing circuitry 11. The image processing circuitry 11 may process the image data for display on one or more electronic displays 12. For example, the image processing circuitry 11 may include a display pipeline, memory-to-memory scaler and rotator (MSR) circuitry, warp compensation circuitry, or additional hardware or software means for processing image data. The image data may be processed by the image processing circuitry 11 to reduce or eliminate image artifacts, compensate for one or more different software or hardware related effects, and/or format the image data for display on one or more electronic displays 12. As should be appreciated, the present techniques may be implemented in standalone circuitry, software, and/or firmware, and may be considered a part of, separate from, and/or parallel with a display pipeline or MSR circuitry. The image processing circuitry 11 may be implemented in the electronic device 10, in the electronic display 12, or a combination thereof. For example, the image processing circuitry 11 may be included in the processor core complex 18, a timing controller (TCON) in the electronic display 12, or any combination thereof.

In some embodiments, pixel or image data may be generated by an image source (e.g., image data, digital code), such as the processor core complex 18, a graphics processing unit (GPU), or an image sensor. Additionally, in some embodiments, image data may be received from another electronic device 10, for example, via the network interface 24 and/or an I/O port 16. Similarly, the electronic display 12 may display an image frame of content based on pixel or image data generated by the processor core complex 18, or the electronic display 12 may display frames based on pixel or image data received via the network interface 24, an input device, or an I/O port 16.

The eye tracker 28 may measure positions and movement of one or both eyes of someone viewing the electronic display 12 of the electronic device 10. For instance, the eye tracker 28 may include a camera that can record the movement of a viewer's eyes as the viewer looks at the electronic display 12. However, several different practices may be employed to track a viewer's eye movements. For example, different types of infrared/near infrared eye tracking techniques such as bright-pupil tracking and dark-pupil tracking may be used. In both of these types of eye tracking, infrared or near infrared light is reflected off of one or both of the eyes of the viewer to create corneal reflections. A vector between the center of the pupil of the eye and the corneal reflections may be used to determine a point on the electronic display 12 at which the viewer is looking. The processor core complex 18 may use the gaze angle(s) of the eyes of the viewer when generating image data for display on the electronic display 12.

Figure 2:
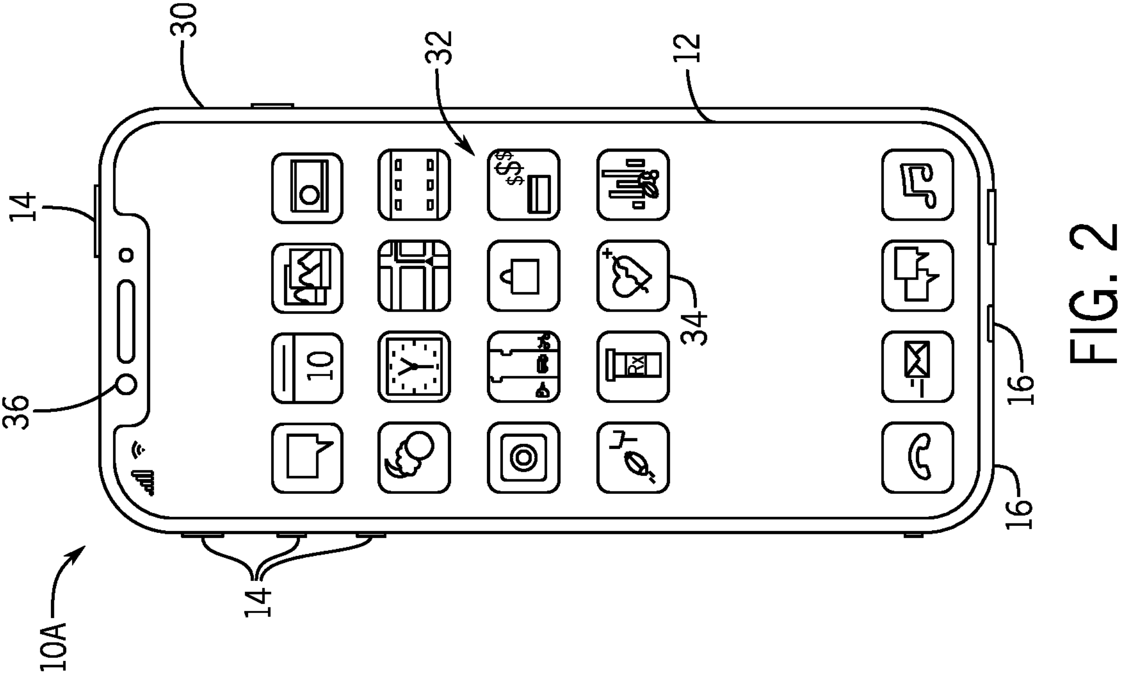
FIG. 2 is a perspective view of a notebook computer representing an embodiment of the electronic device of FIG. 1.

The electronic device 10 may be any suitable electronic device. To help illustrate, an example of the electronic device 10, a handheld device 10A, is shown in FIG. 2. The handheld device 10A may be a portable phone, a media player, a personal data organizer, a handheld game platform, or the like. For illustrative purposes, the handheld device 10A may be a smart phone, such as any IPHONE® model available from Apple Inc.

The handheld device 10A includes an enclosure 30 (e.g., housing). The enclosure 30 may protect interior components from physical damage or shield them from electromagnetic interference, such as by surrounding the electronic display 12. The electronic display 12 may display a graphical user interface (GUI) 32 having an array of icons. When an icon 34 is selected either by an input device 14 or a touch-sensing component of the electronic display 12, an application program may launch. The handheld device 10A includes one or more cameras 36 for capturing images.

The input devices 14 may be accessed through openings in the enclosure 30. The input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, or toggle between vibrate and ring modes.

Figure 3:
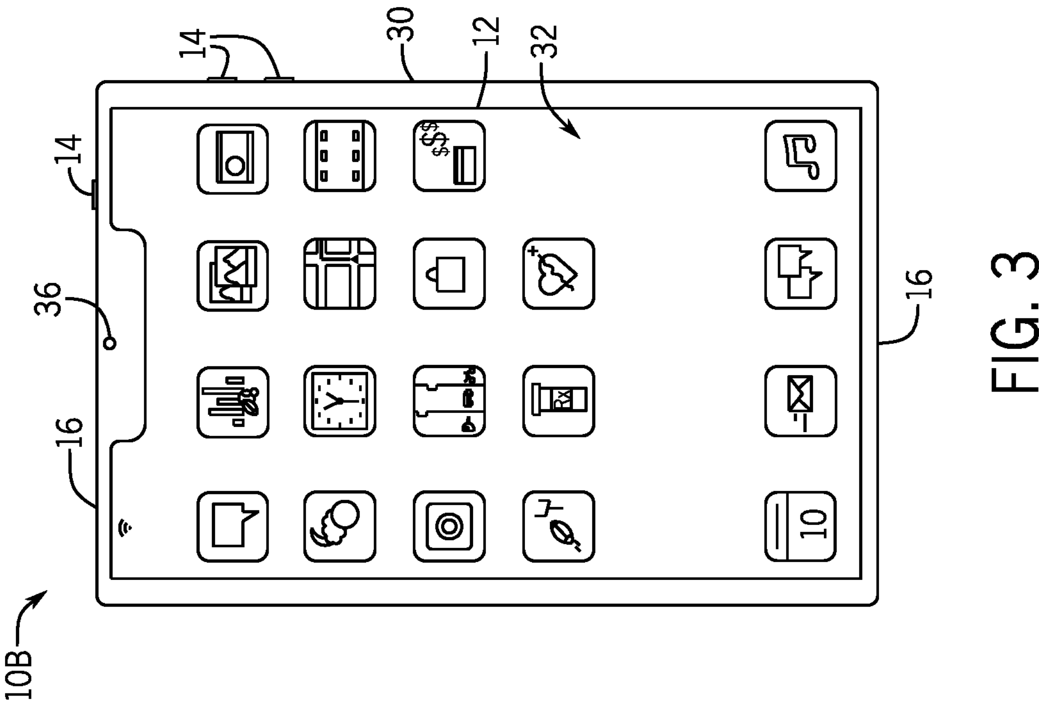
FIG. 3 is a front view of a handheld device representing another embodiment of the electronic device of FIG. 1.
Figure 4:
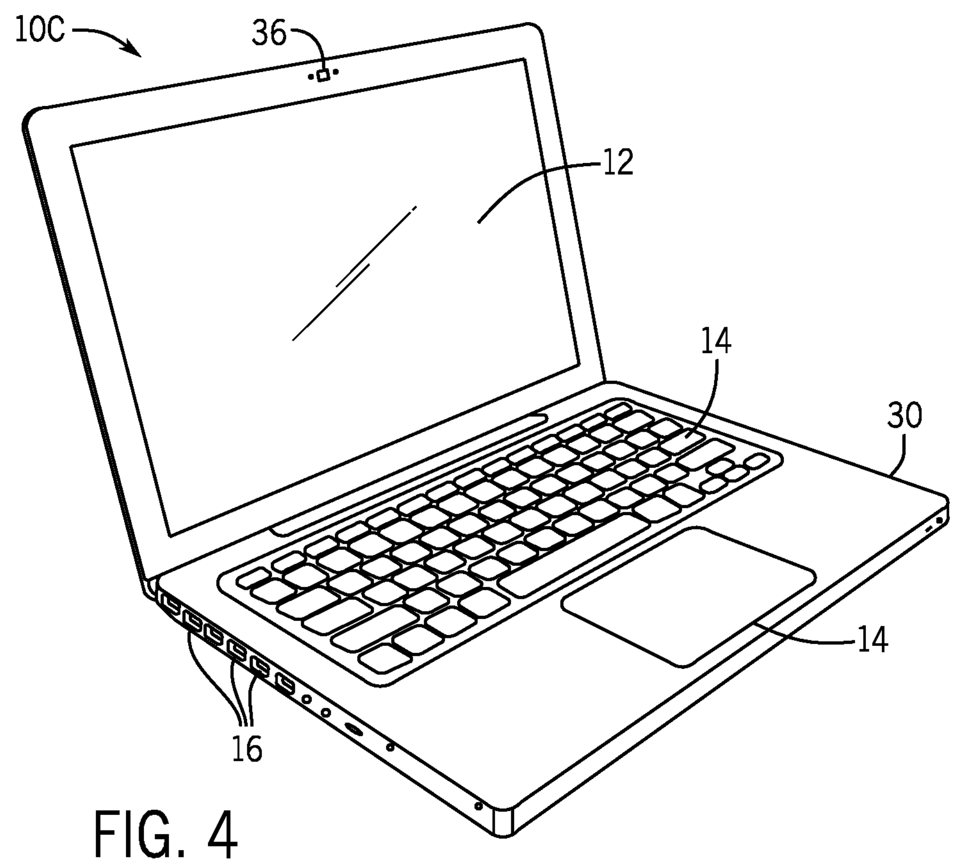
FIG. 4 is a front view of another handheld device representing another embodiment of the electronic device of FIG. 1.
Figure 5:
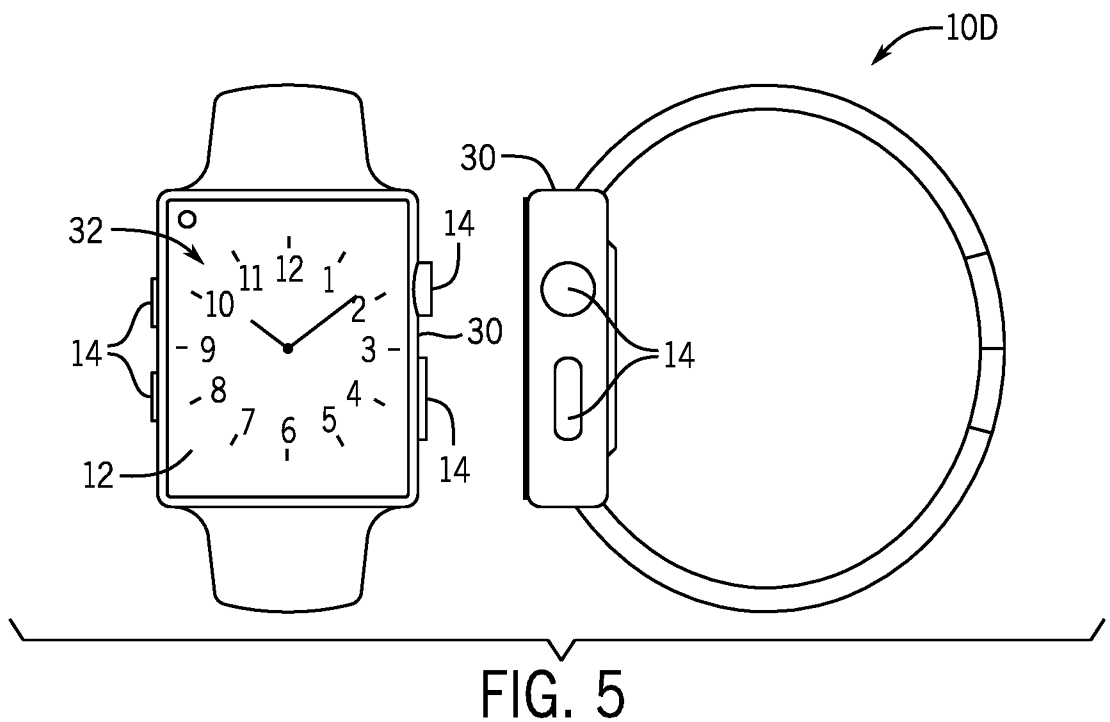
FIG. 5 is a front view and side view of a wearable electronic device representing another embodiment of the electronic device of FIG. 1.

Another example of a suitable electronic device 10, specifically a tablet device 10B, is shown in FIG. 3. The tablet device 10B may be any IPAD® model available from Apple Inc. A further example of a suitable electronic device 10, specifically a computer 10C, is shown in FIG. 4. For illustrative purposes, the computer 10C may be any MACBOOK® or IMAC® model available from Apple Inc. Another example of a suitable electronic device 10, specifically a wearable electronic device 10D, is shown in FIG. 5. For illustrative purposes, the wearable electronic device 10D may be any APPLE WATCH® model available from Apple Inc. As depicted, the tablet device 10B, the computer 10C, and the watch 10D each also includes an electronic display 12, input devices 14, I/O ports 16, and an enclosure 30. The electronic display 12 may display a GUI 32. Here, the GUI 32 shows a visualization of a clock. When the visualization is selected either by the input device 14 or a touch-sensing component of the electronic display 12, an application program may launch, such as to transition the GUI 32 to presenting the icons 34 discussed in FIGS. 2 and 3.

Figure 6:
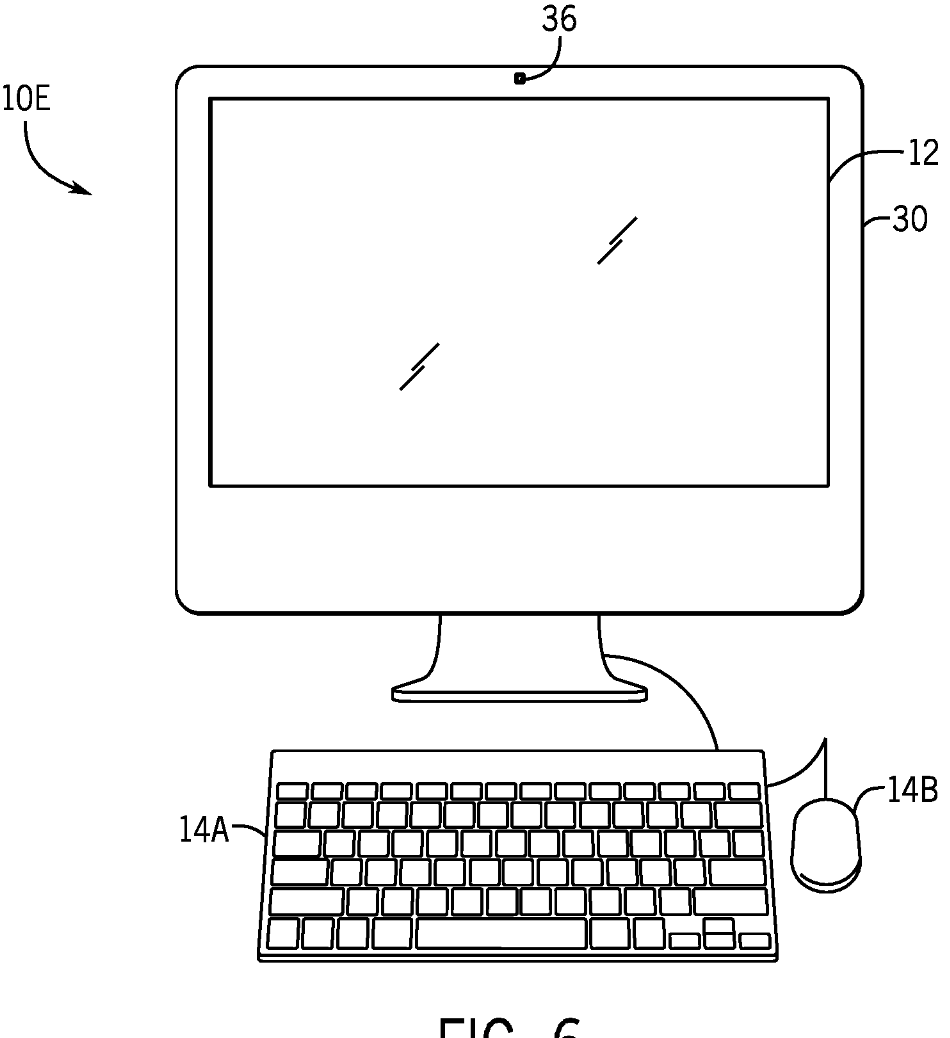
FIG. 6 is a front view of a desktop computer representing another embodiment of the electronic device of FIG. 1.

Turning to FIG. 6, a computer 10E may represent another embodiment of the electronic device 10 of FIG. 1. The computer 10E may be any computer, such as a desktop computer, a server, or a notebook computer, but may also be a standalone media player or video gaming machine. By way of example, the computer 10E may be an iMac®, a MacBook®, or other similar device by Apple Inc. of Cupertino, California. It should be noted that the computer 10E may also represent a personal computer (PC) by another manufacturer. A similar enclosure 30 may be provided to protect and enclose internal components of the computer 10E, such as the electronic display 12. In certain embodiments, a user of the computer 10E may interact with the computer 10E using various peripheral input structures 14, such as the keyboard 14A or mouse 14B (e.g., input structures 14), which may connect to the computer 10E.

Figure 7:
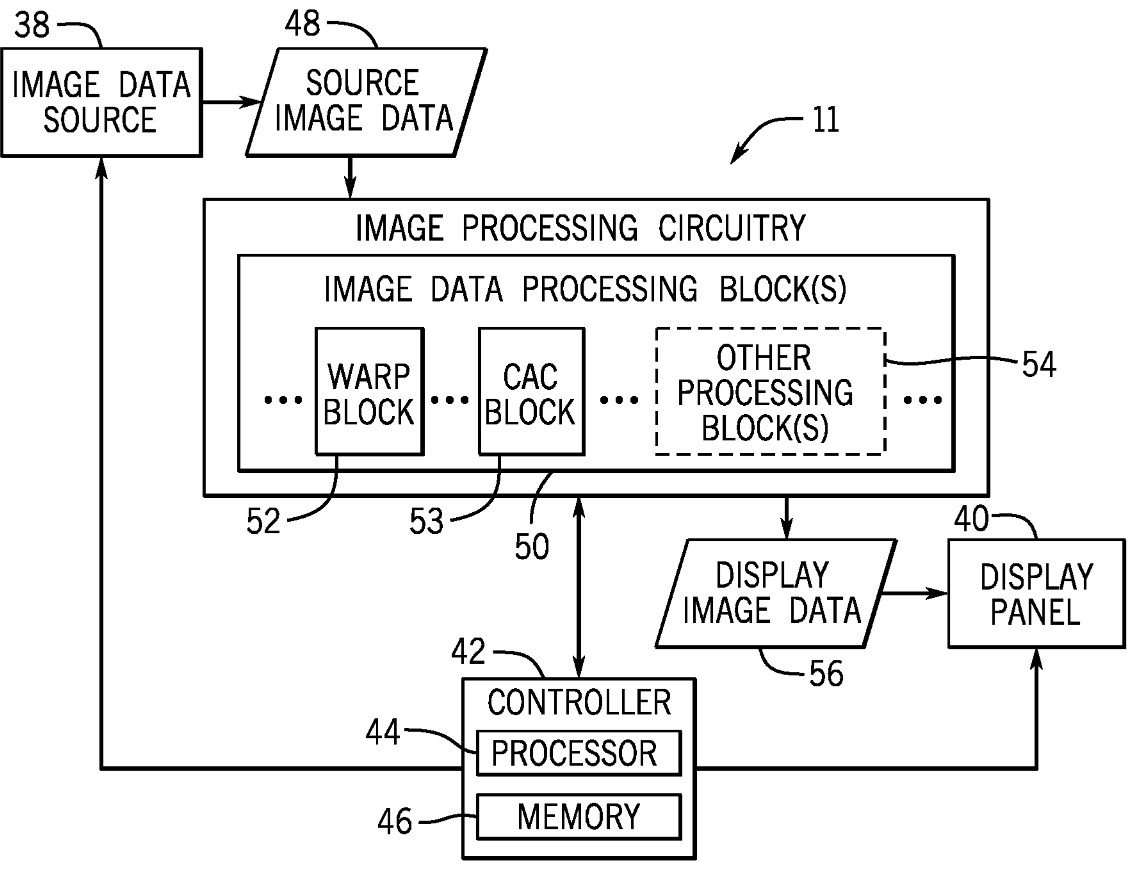
FIG. 7 is a schematic diagram of the image processing circuitry of FIG. 1 including a warp block, according to embodiments of the present disclosure.

To help illustrate, a portion of the electronic device 10, including image processing circuitry 11, is shown in FIG. 7. As should be appreciated, although image processing is discussed herein as being performed via a number of image data processing blocks, embodiments may include hardware or software components to carry out the techniques discussed herein. The electronic device 10 may include an image data source 38, a display panel 40, and/or a controller 42 in communication with the image processing circuitry 11. In some embodiments, the display panel 40 of the electronic display 12 may be a reflective technology display, a liquid crystal display (LCD), or any other suitable type of display panel 40. In some embodiments, the controller 42 may control operation of the image processing circuitry 11, the image data source 38, and/or the display panel 40. To facilitate controlling operation, the controller 42 may include a controller processor 44 and/or controller memory 46. In some embodiments, the controller processor 44 may be included in the processor core complex 18, the image processing circuitry 11, a timing controller in the electronic display 12, a separate processing module, or any combination thereof and execute instructions stored in the controller memory 46. Additionally, in some embodiments, the controller memory 46 may be included in the local memory 20, the main memory storage device 22, a separate tangible, non-transitory, computer-readable medium, or any combination thereof.

The image processing circuitry 11 may receive source image data 48 corresponding to a desired image to be displayed on the electronic display 12 from the image data source 38. The source image data 48 may indicate target characteristics (e.g., pixel data) corresponding to the desired image using any suitable source format, such as an RGB format, an αRGB format, a YCbCr format, and/or the like. Moreover, the source image data may be fixed or floating point and be of any suitable bit-depth. Furthermore, the source image data 48 may reside in a linear color space, a gamma-corrected color space, or any other suitable color space. As used herein, pixels or pixel data may refer to a grouping of sub-pixels (e.g., individual color component pixels such as red, green, and blue) or the sub-pixels themselves.

As described above, the image processing circuitry 11 may operate to process source image data 48 received from the image data source 38. The image data source 38 may include captured images (e.g., from one or more cameras 36), images stored in memory, graphics generated by the processor core complex 18, or a combination thereof. Additionally, the image processing circuitry 11 may include one or more sets of image data processing blocks 50 (e.g., circuitry, modules, or processing stages) such as a warp block 52 and a chromatic aberration correction (CAC) block 53. As should be appreciated, multiple other processing blocks 54 may also be incorporated into the image processing circuitry 11, such as a white point compensation (WPC) block, a color lookup table (CLUT) block, an optical crosstalk compensation (OXTC) block, a burn-in compensation (BIC), a pixel contrast control (PCC) block, a sub-pixel uniformity compensation (SPUC) block, a color management block, a dither block, a blend block, a scaling/rotation block, etc. before and/or after the warp block 52, or before and/or after the CAC block 53. A pipeline may be used for preparing the source image data 48 to be displayed on the display panel 40, and the pipeline may use one or more processing blocks in the image data processing blocks 50. For example, the pipeline may include a frontend, which may include several processing blocks, such as the warp block 52, the blend block, and the color management block, etc. The pipeline may also include a backend, which may include several processing blocks, such as the WPC block, the CLUT block, the CAC block 53, the OXTC block, the BIC block, the PCC block, the SPUC block, and the dither block, etc. The image data processing blocks 50 may receive and process source image data 48 and output display image data 56 in a format (e.g., digital format, image space, and/or resolution) interpretable by the display panel 40. Further, the functions (e.g., operations) performed by the image processing circuitry 11 may be divided between various image data processing blocks 50, and, while the term "block" is used herein, there may or may not be a logical or physical separation between the image data processing blocks 50.

Figure 8:
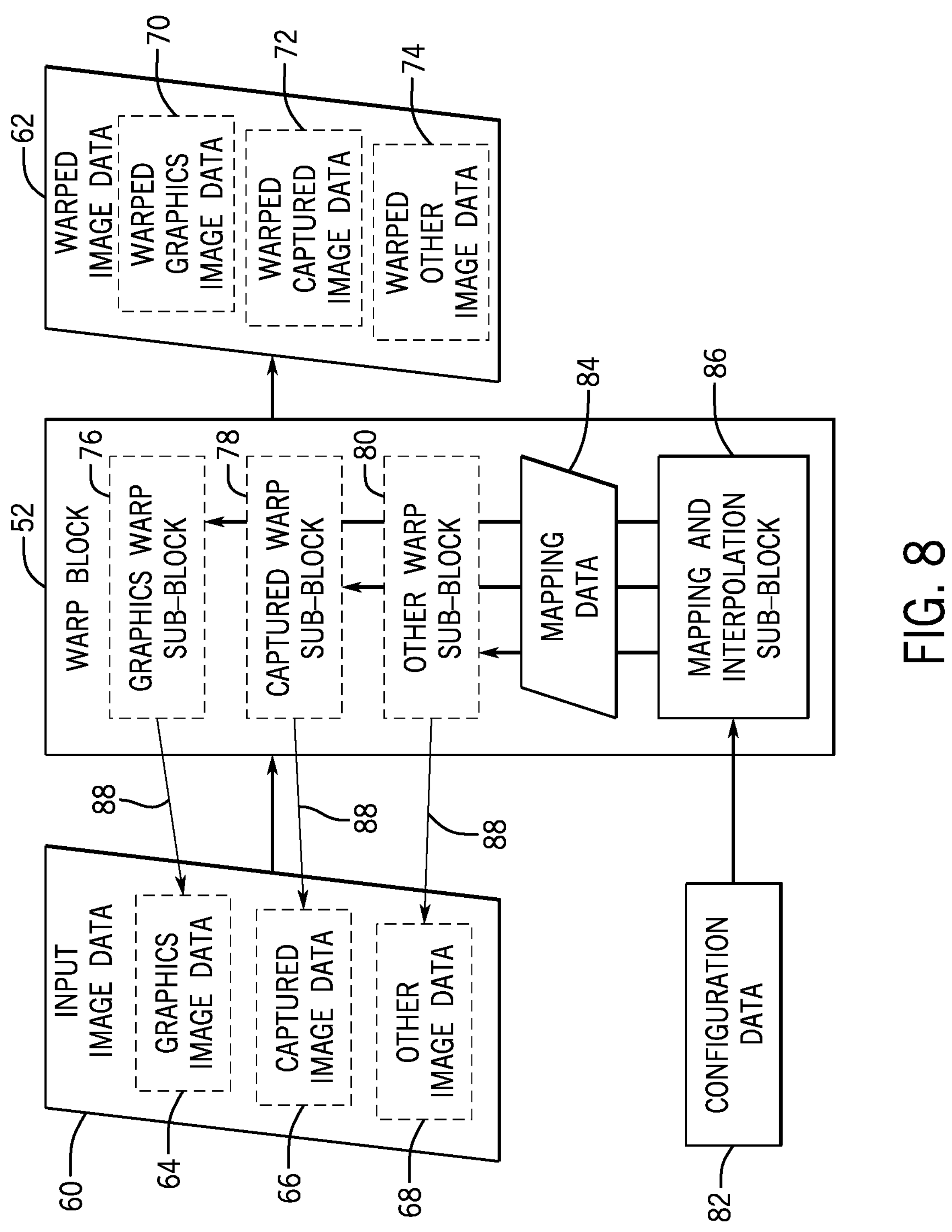
FIG. 8 is a schematic diagram of the warp block of FIG. 7, according to embodiments of the present disclosure.
Figure 9:
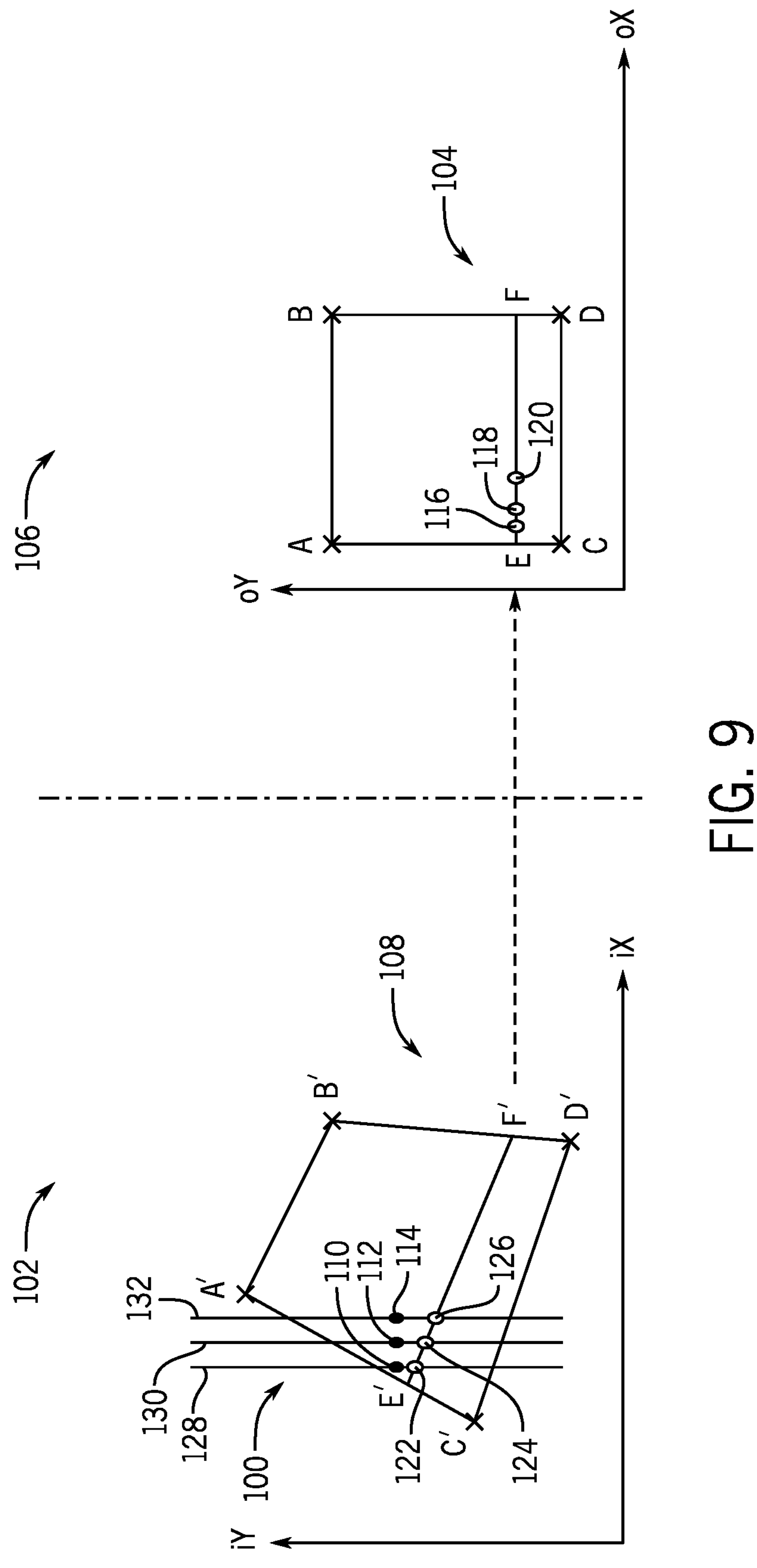
FIG. 9 shows an input image converted to a warped input image using a mapping, according to embodiments of the present disclosure.
Figure 10:
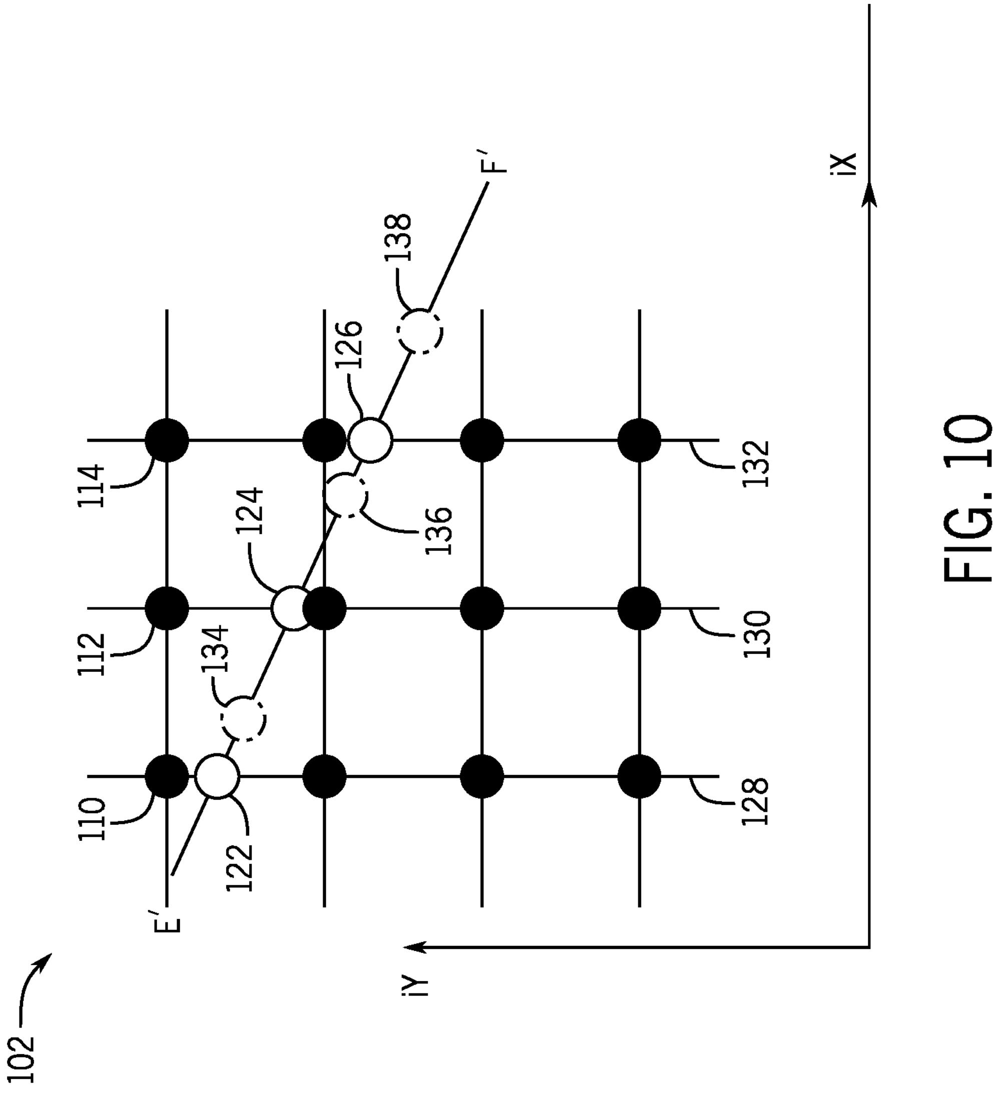
FIG. 10 illustrates the horizontal mapping stage of the mapping in FIG. 9, according to embodiments of the present disclosure.
Figure 11:
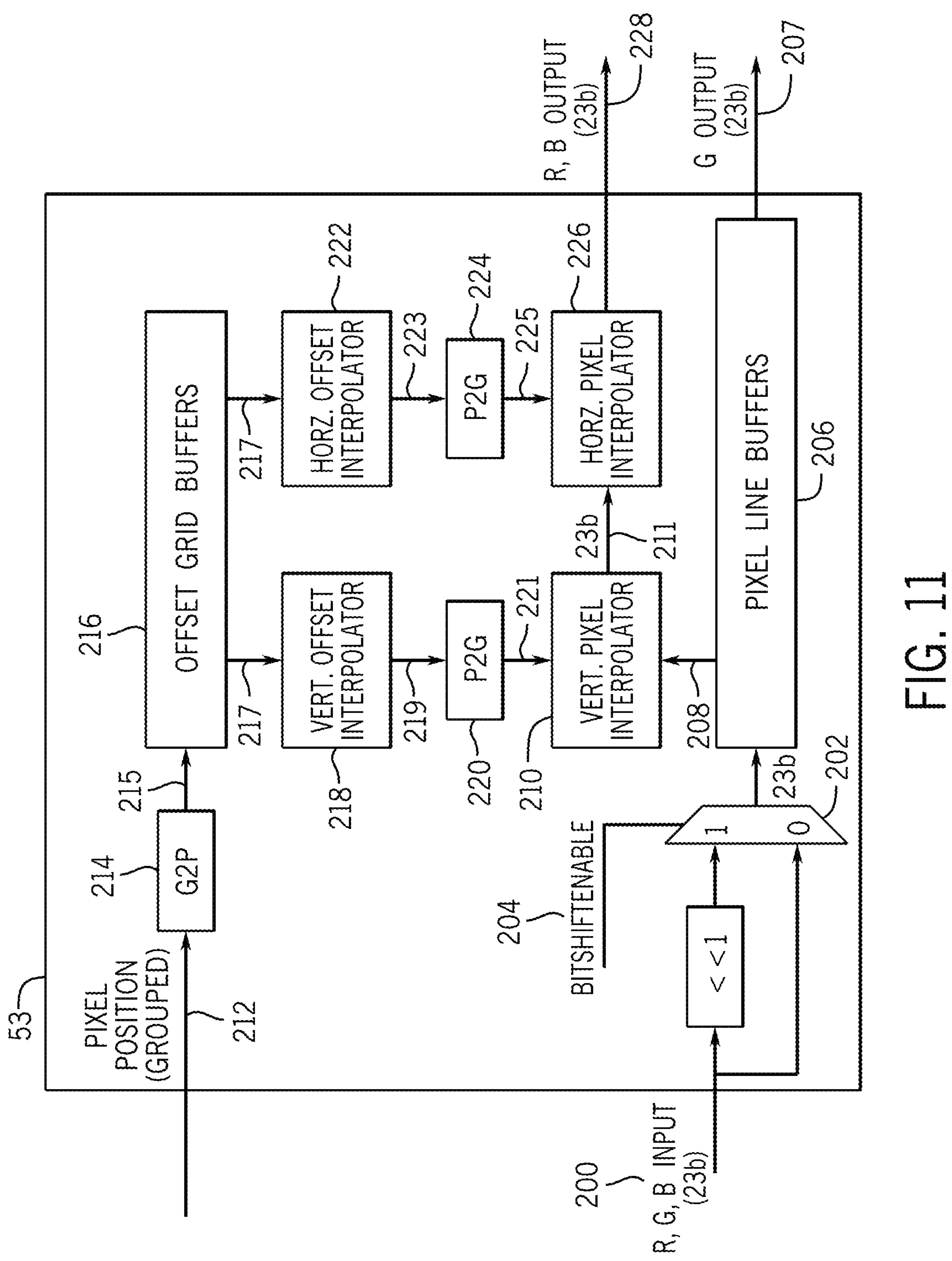
FIG. 11 is a schematic diagram of the CAC block of FIG. 7, according to embodiments of the present disclosure.
Figure 12:
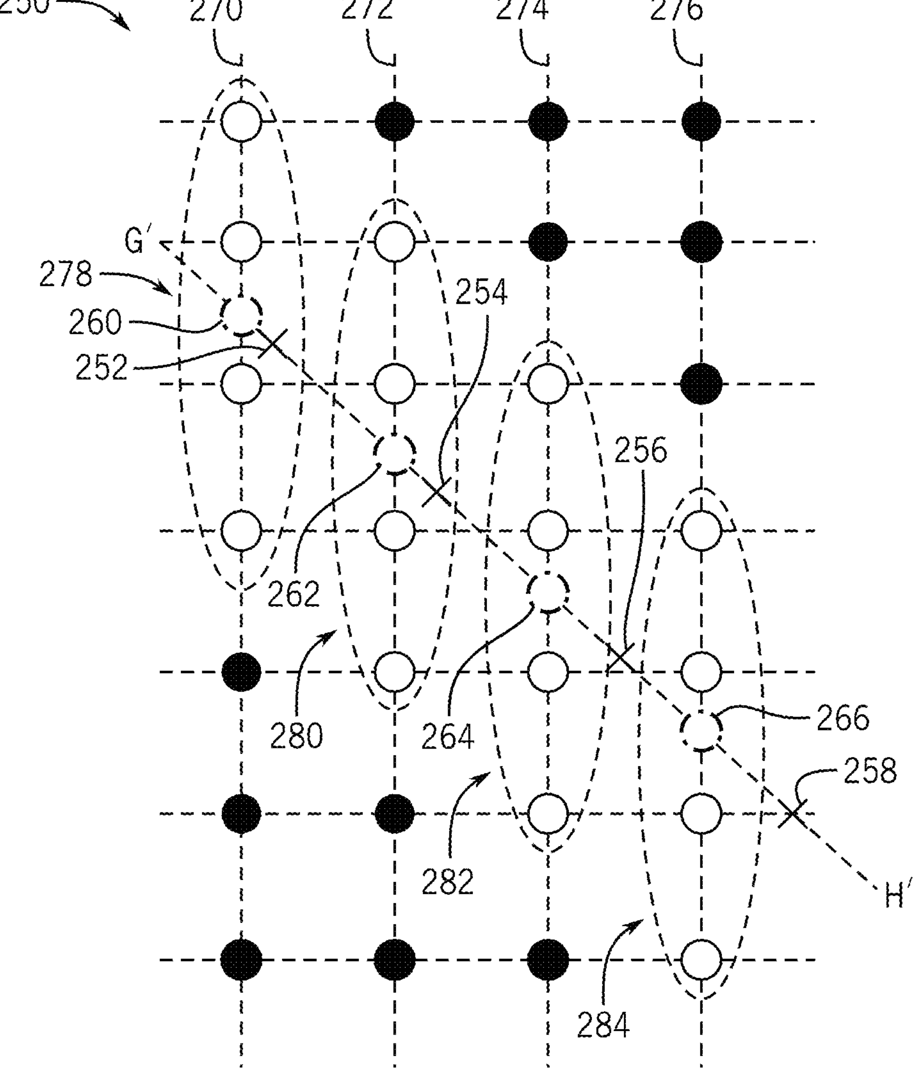
FIG. 12 illustrates a vertical pixel interpolation operation, according to embodiments of the present disclosure.

FIG. 8 is a schematic diagram of the warp block 52 of FIG. 7. In some scenarios, an image to be displayed may, if unaltered, appear distorted when perceived by a viewer due to environmental effects, properties of the electronic display 12, the viewer's perspective (e.g., POV), image processing alterations such as shifts and scaling, and/or other distorting factors. As such, in some embodiments, the warp block 52 may remap input image data 60 such that the generated warped image data 62 accounts for such distortions when displayed (e.g., on the display panel 40), as illustrated in FIGS. 9 & 10. For color-dependent distortions, the input image data 60 may include image data from a first color channel (e.g., green channel) of the source image data 48, and the warp block 52 may generate the warped image data 62 for the first color channel. Accordingly, the warped image data 62 for the first color channel may be generated in the frontend of the pipeline, and the image data from the other channels (e.g., red channel, blue channel) may be compensated in the CAC block 53, which may be at the backend of the pipeline. The image data from the other channels (e.g., red channel, blue channel) may be compensated for the chromatic aberration based on the offsets (e.g., vertical offsets, horizontal offsets) between the corresponding channel and the first color channel, as illustrated in FIGS. 11-12.

As should be appreciated, the input image data 60 may include any suitable image data desired to be transformed (e.g., warped). For example, the input image data 60 may include graphics image data 64 (e.g., a stored or generated digital image), captured image data 66 (e.g., a video image taken by a camera 36), and/or other image data 68 such as matting image data generated to represent alpha values for an image blending process, image data received via the network interface 24 or the I/O ports 16), etc. As such, the warp block 52 may generate the warped image data 62 (e.g., warped graphics image data 70, warped captured image data 72, warped other image data 74, etc.) to change the amount (e.g., resolution) or distribution such as (e.g., shape, relative size, perspective, etc.) of pixel values of the input image data 60 to account for different display scenarios and/or input image characteristics.

For example, the warped image data 62 may account for curved edges and/or lensing effects (e.g., of a cover glass) associated with the display panel 40 and/or for a viewer's POV relative to the display panel 40 or relative to an image capturing device (e.g., the camera 36). Furthermore, the electronic display 12 may be a foveated display such that different portions of the display panel 40 are displayed at different resolutions (e.g., depending on a viewer's gaze), and the warp block 52 may consider the resolution at the different portions of the display panel 40 when determining the mapping between the input image data 60 and the warped image data 62. Additionally, the warp block 52 may also take into account distortions associated with the input image data 60 and/or the image data source 38. For example, captured image data 66 may be warped to account for lensing effects (e.g., camera lens distortion) associated with capturing the image and/or to account for a difference between the POV of a user and the POV of the camera 36. As should be appreciated, captured image data 66 is given as an example set of input image data 60 that may be warped for distortions associated with the image data source 38 and any set of input image data 60 may be warped for distortions associated with the respective image data source 38 and/or to obtain a common image space. Moreover, multiple warp operations (e.g., accounting for multiple distortion effects) may be accomplished via a single warp (e.g., a single mapping accounting for multiple distortions) or consecutively warped. As such, before being displayed, input image data 60 may be warped to change to the amount or distribution of pixel values such that the perceived image has limited or no distortion.

Furthermore, in some embodiments, the warp block 52 may warp multiple different sets of input image data 60 (e.g., graphics image data 64, captured image data 66, other image data 68, etc.) simultaneously (e.g., in parallel) or sequentially for use separately or together. For example, an image may be generated by blending multiple sets of input image data 60 from one or more image data sources 38. However, in some scenarios, image data to be blended may be warped to a common image space prior to blending, which may be accomplished by the warp block 52. Image blending may be utilized (e.g., for virtual reality, mixed reality, and/or augmented reality) to incorporate multiple sets of warped image data 62 into a single image frame. For example, a generated object (e.g., warped graphics image data 70) may be incorporated into a captured image of a real-life surrounding (e.g., warped captured image data 72) and/or a portion of the captured image may be utilized as a separate blended layer for a foreground (e.g., based on warped matting image data) such that the generated object is between the portion in the foreground and a background portion of a captured image. Additionally or alternatively, a portion of a captured image (e.g., warped captured image data 72) may be incorporated into a virtual surrounding (e.g., warped graphics image data 70). As such, the input image data 60 of one or more image data sources 38 may be blended together to form a single output image after being warped to a common image space via the warp block 52.

As discussed above, the warp block 52 of the image processing circuitry 11 may warp one or more sets of input image data 60 to account for input distortions (e.g., camera lens distortion), output distortions (e.g., lensing effects associated with the shape of the display panel and/or glass cover thereof), processing distortions (e.g., a POV change, shifts, scaling, etc.) and/or to achieve a common image space for blending. Moreover, the image processing circuitry may include separate warp hardware (e.g., for parallel processing) and/or perform separate warp operations using the same hardware for different sets of input image data. For example, in some embodiments, the warp block 52 may include a graphics warp sub-block 76, a captured warp sub-block 78, and/or another warp sub-block 80. As should be appreciated, the sub-blocks described herein are given as examples, and any suitable warping sub-block may utilize the features discussed herein to warp any suitable set of input image data 60 and generate warped image data 62.

In some embodiments, the warp block 52 may utilize configuration data 82 associated with the desired warp effects to generate a mapping from the input image data 60 to the warped image data 62. The configuration data 82 may include mappings, algorithms, and/or parameters indicative of the warp to be accomplished for a set of input image data 60. Furthermore, the configuration data 82 may include static and/or dynamic aspects and may include different parameters/mappings for different sets of input image data 60. For example, the configuration data 82 may include a static mapping between a generated graphics image space (e.g., graphics image data 64) to a display image space (e.g., warped graphics image data 70) accounting for distortions associated with the electronic display 12 that do not change. Moreover, the configuration data 82 may include a static mapping between a camera image space (e.g., captured image data 66) to a display image space (e.g., warped captured image data 72) accounting for camera lens distortions that do not change and distortions associated with the electronic display 12 that do not change. As should be appreciated, captured image data 66 from a camera 36 is given as an example set of input image data 60, and such data may or may not be processed or partially processed prior to the warp block 52 of the image processing circuitry 11.

Dynamic aspects of the configuration data may provide for different mappings according to the scenario at the time of warping (e.g., for the image frame being processed). For example, in a foveated display, the output resolution at different portions of the display panel may change depending on a focal point of the user's gaze (e.g., determined by eye-tracking), which may alter the mapping. In other words, which input pixels of the input image data 60 map to which output pixel positions for the display panel 40 (e.g., as characterized by warping the warped image data 62) may change based on parameters, algorithms, mappings, etc. that are captured in the configuration data 82. As should be appreciated, the configuration data 82 may include any suitable information (e.g., parameters, tags, flags, algorithms, mappings, etc.) that characterize the warp to be achieved for a particular set of input image data 60. For instance, the dynamic part of the distortions, i.e., the warp characteristics that change (e.g., POV changes, shifts, scaling, foveation related resolution changes, etc.), may be decoupled from the rest of the distortions and be processed separately. For example, the image data may be pre-warped in the warp block 52 based on the first color channel (e.g., green channel) only geometric distortion. The CAC block 53 may apply spatial resampling to other color channels (e.g., red and blue channels) to compensate the dynamic part of the chromatic aberration based on distortion differences between the other color channels (e.g., red and blue channels) and the first color channel (e.g., green channel) in the ungrouped space (e.g., display panel space). The compensated image data may be converted to the grouped space by pixel grouping. The dynamic chromatic aberration correction may be applied for per-frame update. For foveated display, both the input and output of the CAC block 53 are in the grouped space, and pixels are directly resampled from the grouped space to the grouped space.

Based on the configuration data 82, mapping data 84 may be generated (e.g., via a mapping and interpolation sub-block 86) correlating the output pixel values of the warped image data 62 to pixel values of the input image data 60. As should be appreciated, the output image space may be associated with the physical pixel locations of the display panel 40 (e.g., the display image space) or any desired image space. Moreover, the warp block 52 (e.g., the graphics warp sub-block 76, the captured warp sub-block 78, the other warp sub-block 80, etc.) may perform fetches 88 of the input image data 60 from the relevant image data source 38 (e.g., memory 20, a graphics generator of the processor core complex 18, other processing blocks 54, a network interface 24, a camera 36, etc.). Utilizing the mapping data 84, the warp block 52 may generate warped image data 62 based on the input image data 60.

FIG. 9 shows a warped input image 100 (e.g., A'B'C'D') in an input image space 102. The warped input image 100 may be warped (e.g., by the warp block 52) to account for one or more physical or digital effects associated with displaying the image data. The warped input image 100, when displayed (e.g., on the display panel 40 or in a viewer's eye), corresponds to an output image 104 (e.g., ABCD) in an output image space 106 (e.g., on the display panel 40 or in a viewer's eye). For example, the output image 104 may correspond to the input image without being distorted due to the one or more physical or digital effects. Accordingly, to display the image 104 in the output image space 106, the corresponding input image (not shown) may be warped to the warped input image 100 by a mapping 108. For instance, without the mapping 108, an image in the input image space 102 may be distorted when displayed in the output image space 106 (e.g., on the display panel 40 or in a viewer's eyes). The warped image 100 generated by the mapping 108 may account for the distortions. The mapping 108 may include a vertical mapping stage for mapping Y coordinate and a horizontal mapping stage for mapping X coordinate. In a separable warp architecture, the vertical mapping stage may be separated from the horizontal mapping stage. For example, the input pixels in the input image space 102 may be mapped to intermediate locations in the vertical mapping stage of the mapping 108. And in the horizontal mapping stage, the intermediate locations may be mapped to locations corresponding to output pixels in the output image space 106. For example, the input image may include three input pixels, 110, 112, and 114, which, when displayed in the output image space 106, correspond to three output pixels 116, 118, and 120, respectively. The three input pixels 110, 112, and 114 may be warped to the warped input image 100 by the mapping 108. For example, the three input pixels 110, 112, and 114 may be mapped to three intermediate locations 122, 124, and 126 on a line E'F' in the warped input image 100 in the vertical mapping stage of the mapping 108. The intermediate locations 122, 124, and 126 are obtained by mapping the input pixels 110, 112, and 114 to the line E'F' along corresponding vertical lines 128, 130, and 132, respectively, in the vertical mapping stage of the mapping 108. The line E'F' may correspond to a horizontal line EF in the output image 104, as illustrated in FIG. 9. Accordingly, the line E'F', when displayed in the output image space 106, corresponds to the line EF. The intermediate locations 122, 124, and 126 may be mapped along the line E'F' to locations corresponding to the output pixels 116, 118, and 120, respectively, in the horizontal mapping stage of the mapping 108, as illustrated in FIG. 10.

FIG. 10 illustrates the horizontal mapping stage of the mapping 108. As described above, the intermediate locations 122, 124, and 126 are obtained by mapping the input pixels 110, 112, and 114 to the line E'F' along corresponding vertical lines 128, 130, and 132, respectively, in the vertical mapping stage of the mapping 108. In the horizontal mapping stage of the mapping 108, the intermediate locations 122, 124, and 126 may be mapped to locations 134, 136, and 138, respectively, along the line E'F'. The locations 134, 136, and 138, when displayed in the output image space 106, correspond to the output pixels 116, 118, and 120, respectively. Accordingly, the mapping 108 maps the input pixels 110, 112, and 114 to the locations 134, 136, and 138 on the line E'F', which correspond to the output pixels 116, 118, and 120 on the line EF in the output image 104, respectively. The mapping 108 with separable warp architecture, as described in FIGS. 9 & 10, may be used in the warp block 52 and/or the CAC block 53. In addition, the reverse mapping of the mapping 108 may be used to convert pixels from the warped input image 100 to the input image. Accordingly, the reverse mapping of the mapping 108 may be used to map relative locations of pixels in the output image space 106 (e.g., on the display panel 40 or in a viewer's eye) to the input image. For example, a distance between the output pixels 116 and 118 on the line EF in the output image space 106 may correspond to a distance between the locations 134 and 136 on the line E'F' in the input image space 102. Since the locations 134 and 136 are obtained from the input pixels 110 and 112, respectively, via the mapping 108, a reverse mapping of the mapping 108 may convert the locations 134 and 136 to the input pixels 110 and 112, respectively.

Due to chromatic aberrations, distortions may be color dependent. Thus, different color channels of the same input image may correspond to different output images in the output image space 106, which means the output images of different color channels of the input image may have distortion offsets in the output image space 106. Thus, the mapping 108 may be different for different color channels. For lateral chromatic aberrations, the output images for different color channels may be corrected by using the distortion offsets. As mentioned previously, for color dependent distortions, the input image data 60 may include image data from a first color channel (e.g., green channel) of the source image data 48, and the warp block 52 may generate the warped image data 62 for the first color channel, for example, by using the method describe above in FIGS. 9 & 10. In some embodiments, the warped image data 62 may be in a grouped space (e.g., foveated display). The warped image data 62 for the first color channel may be input into the CAC block 53 and used to compensate image data from the other channels (e.g., red channel, blue channel). The image data from the other channels (e.g., red, blue) may be compensated for the chromatic aberrations based on the relative distortion offsets (e.g., vertical offsets, horizontal offsets) between the corresponding channel and the first color channel, as illustrated in FIG. 11.

FIG. 11 is a schematic diagram of the CAC block 53 of FIG. 7. The input image data 200 may include image data from multiple color channels (e.g., red (R), green (G), blue (B)), and the image data from the first color channel (e.g., green (G)) are pre-warped (e.g., in the warp block 52) to compensate geometric distortions caused by one or more physical or digital effects associated with displaying the image data. The input image data 200 may be in a grouped space (e.g., the warped image space of the warp block 52) for foveated display. A programmable selector 202 may be used to select whether a bit-shift function may be applied to the input image data 200 based on a bit-shift enable signal 204. The bit-shift function may be used to accommodate the bit-depth requirement (e.g., for the CLUT block) in the downstream of the CAC block 53. A pixel line buffers 206 may be used to store the input image data 200, and the image data of the first color channel (e.g., green (G)), which are pre-warped, may be delayed in delay buffers to match outputs from other color channels (e.g., red (R), blue (B)). Thus, the CAC block 53 may only process chromatic aberration corrections for the other color channels (e.g., red, blue) and leave the first color channel (e.g., green) unchanged. The delayed image data of the first color channel (e.g., green (G)) 207 may be output from the CAC block 53 when image data of other color channels (e.g., red (R), blue (B)) are processed and output from the CAC block 53. The corrected image data for all color channels may be combined together for display.

The input image data of the other color channels (e.g., red (R), blue (B)) 208 may be input into a vertical pixel interpolation block 210. Corresponding grouped pixel positions 212 of the input image data 208 in the grouped space may be input into a grouped space-to-panel space (G2P) block 214 to convert from the grouped space to the output image space 106 (e.g., display panel space). Accordingly, the output of the G2P block 214 includes corresponding output pixel positions 215 of the input image data 208 in the output image space 106, which may be input into offset grid buffers 216. Each grid point in the offset grid buffers 216 may have four components corresponding to the distortion offsets of the other color channels (e.g., red (R), blue (B)) from the first color channel (e.g., green (G)) along the oX and oY directions in the output image space 106 due to the chromatic aberrations. For example, the four components may include R_dx and R_dy corresponding to offsets along the oX and oY directions for red (R) channel, and B_dx and B_dy corresponding to offsets along the oX and oY directions for blue (B) channel. The output pixel positions 215 of the other color channels (e.g., red, blue) may be adjusted by using the corresponding offsets at each grid point. The output of the offset grid buffers 216 may include adjusted pixel positions 217 for the other color channels (e.g., red and blue) in the output image space 106, which are compensated for the chromatic aberrations. The adjusted pixel positions 217 may be input into a vertical offset interpolator 218 to perform vertical grid interpolation in the output image space 106 to map to the display pixels in the output image space 106. For example, a linear interpolation may be used in the vertical offset interpolator 218. The output from the vertical offset interpolator 218 may include output pixels 219 with vertically corrected pixel positions in the output image space 106. The output pixels 219 may be input into a panel space-to-grouped space (P2G) block 220 to convert to the grouped space. The output of the P2G block 220 may include vertically corrected pixel positions 221 in the grouped space, and may be input into the vertical pixel interpolation block 210 to obtain the corresponding vertical pixel values 211 for the vertically corrected pixel positions 221, as described in FIG. 12. The corresponding vertical pixel values 211 may be input into a horizontal pixel interpolation block 226 and used for horizontal pixel interpolation.

In addition, the adjusted pixel positions 217 may be input into a horizontal offset interpolator 222 to perform horizontal grid interpolation in the output image space 106 to map to the display pixels in the output image space 106. For example, a linear interpolation may be used in the horizontal offset interpolator 222. The output from the horizontal offset interpolator 222 may include output pixels 223 with horizontally corrected pixel positions in the output image space 106. The output pixels 223 may be input into a P2G block 224 to convert to the grouped space. The output of the P2G block 224 may include horizontally corrected pixel positions 225 in the grouped space. The horizontally corrected pixel positions 225 may be input into the horizontal pixel interpolation block 226 and used with the corresponding vertical pixel values 211 to obtain the chromatic aberrations corrected input image data 228 for the other channel (e.g., red, blue). The method described above may be performed on all other color channels (e.g., red, blue), and the corrected input image data 228 for all other color channels and the delayed image data of the first channel 207 may be output from the CAC block 53 and combined together for display.

FIG. 12 shows a process of vertical pixel interpolation for a color channel (e.g., red, blue) used in the block 210 of FIG. 11. An input fetching window 250 (e.g., 4×7 pixels) may be used when fetching a group of pixels (e.g., 4×7 pixels) from the pixel line buffers 206 to the vertical pixel interpolation block 210. As mentioned above, the pixel line buffers 206 store the input image data 200 in the grouped space with the image data of the first color channel (e.g., green (G)) pre-warped to correct geometry distortions. Accordingly, the input fetching window 250 may include a set of input image pixels in the grouped space for one color channel (e.g., red, blue). The corrected input image data 228 in the grouped space may include pixels in the one color channel (e.g., red, blue) corresponding to locations 252, 254, 256, and 258 along a line G'H' in the grouped space. The vertically corrected pixel positions 221 from the P2G block 220 may include corresponding vertically corrected locations 260, 262, 264, and 266 for the locations 252, 254, 256, and 258 in the grouped space. Corresponding vertically corrected positions 260, 262, 264, and 266 for the locations 252, 254, 256, and 258 in the grouped space may be at corresponding intersections of the line G'H' with the vertical pixel lines of the input image pixels in the input fetching window 250. For example, the corrected position 260 for the location 252 is at the intersection of the line G'H' with a vertical pixel line 270 in the input fetching window 250; the corrected position 262 for the location 254 is at the intersection of the line G'H' with a vertical pixel line 272 in the input fetching window 250; the corrected position 264 for the location 256 is at the intersection of the line G'H' with a vertical pixel line 274 in the input fetching window 250; the corrected position 266 for the location 258 is at the intersection of the line G'H' with a vertical pixel line 276 in the input fetching window 250. Corresponding pixel values for the corrected vertical positions 260, 262, 264, and 266 in the grouped space may be obtained by using vertical pixel interpolations in the block 210. For example, the corrected position 260 may be inside of a pixel group 278, and its pixel value may be determined by the pixels in the pixel group 278; the corrected position 262 may be inside of a pixel group 280, and its pixel value may be determined by the pixels in the pixel group 280; the corrected position 264 may be inside of a pixel group 282, and its pixel value may be determined by the pixels in the pixel group 282; and the corrected position 266 may be inside of a pixel group 284, and its pixel value may be determined by the pixels in the pixel group 284. The number of pixels inside each pixel group may vary (e.g., 2, 3, or 4 pixels) and may be different or the same for different pixel groups, which may be associated with corresponding locations of the pixel groups. The corresponding pixel values and the vertically corrected positions 260, 262, 264, and 266 may be input into the horizontal pixel interpolation 226. Similar as the horizontal mapping stage of the mapping 108 illustrated in FIG. 10, the horizontal pixel interpolation block 226 may use the horizontally corrected pixel positions 225 to obtain the locations 252, 254, 256, and 258.

Figure 13:
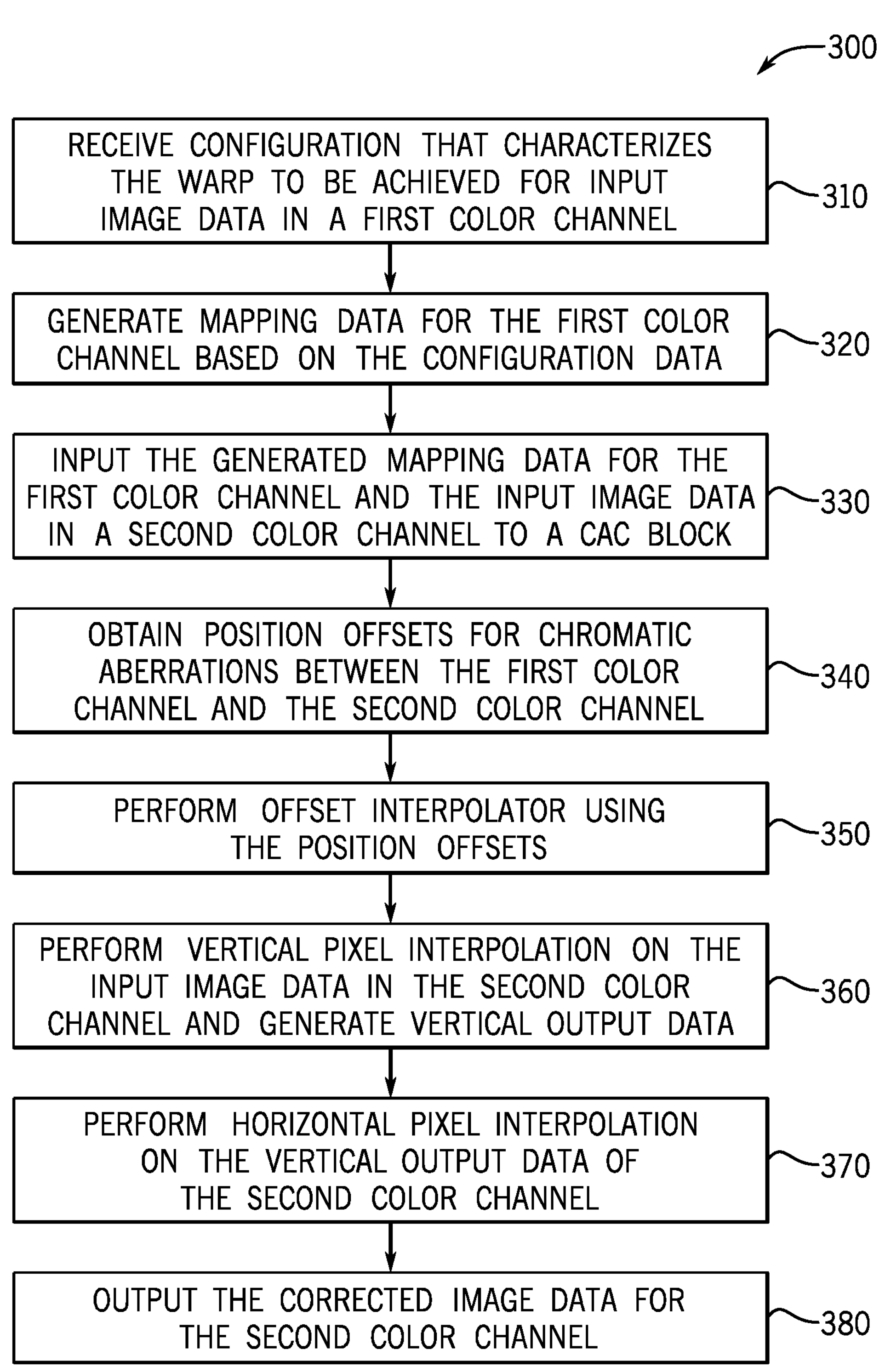
FIG. 13 is a flowchart for applying the chromatic aberrations correction, according to embodiments of the present disclosure.

FIG. 13 shows a method 300 for applying the chromatic aberrations correction to a color channel of the input image data. At block 310, a configuration data is used to characterize the warp to be achieved between an input image space and an output image space for input image data in a first color channel (e.g., green). At block 320, the first color channel (e.g., green) of input image data may be warped (e.g., in the warp block 52) into a grouped space based on the configuration data. At block 330, the warped first color channel (e.g., green) of the input image data and a second color channel (e.g., red, blue) of the input image data in the grouped space may be input into a CAC block (e.g., the CAC block 53). The chromatic aberration position offsets between the first color channel (e.g., green) and the second color channel in the output image space may be obtained at block 340. The position offsets may be stored in the CAC block. For example, the position offsets may be stored in the offset grid buffers 216. At block 350, the offset interpolator may perform grid interpolation (e.g., vertically, horizontally) to obtain corrected pixel positions in the output image space. The pixel positions in the output image space may be converted into the grouped space. At block 360, the CAC block may perform vertical pixel interpolation on the second color channel of the input image data in the grouped space and generate vertical output data. At block 370, the CAC block may perform horizontal pixel interpolation on the vertical output data of the second color channel. At block 380, the CAC block may output the corrected image data for the second color channel. To protect the privacy of the image content, on-the-fly calculations may be used. For example, in the offset interpolation at block 350, slope may be computed on-the-fly (e.g., with Newton-Raphson method), and on-the-fly conversion may be used from ungrouped space to grouped space, and vice versa. The CAC function may be disabled, for example, for power saving.

Figure 14:
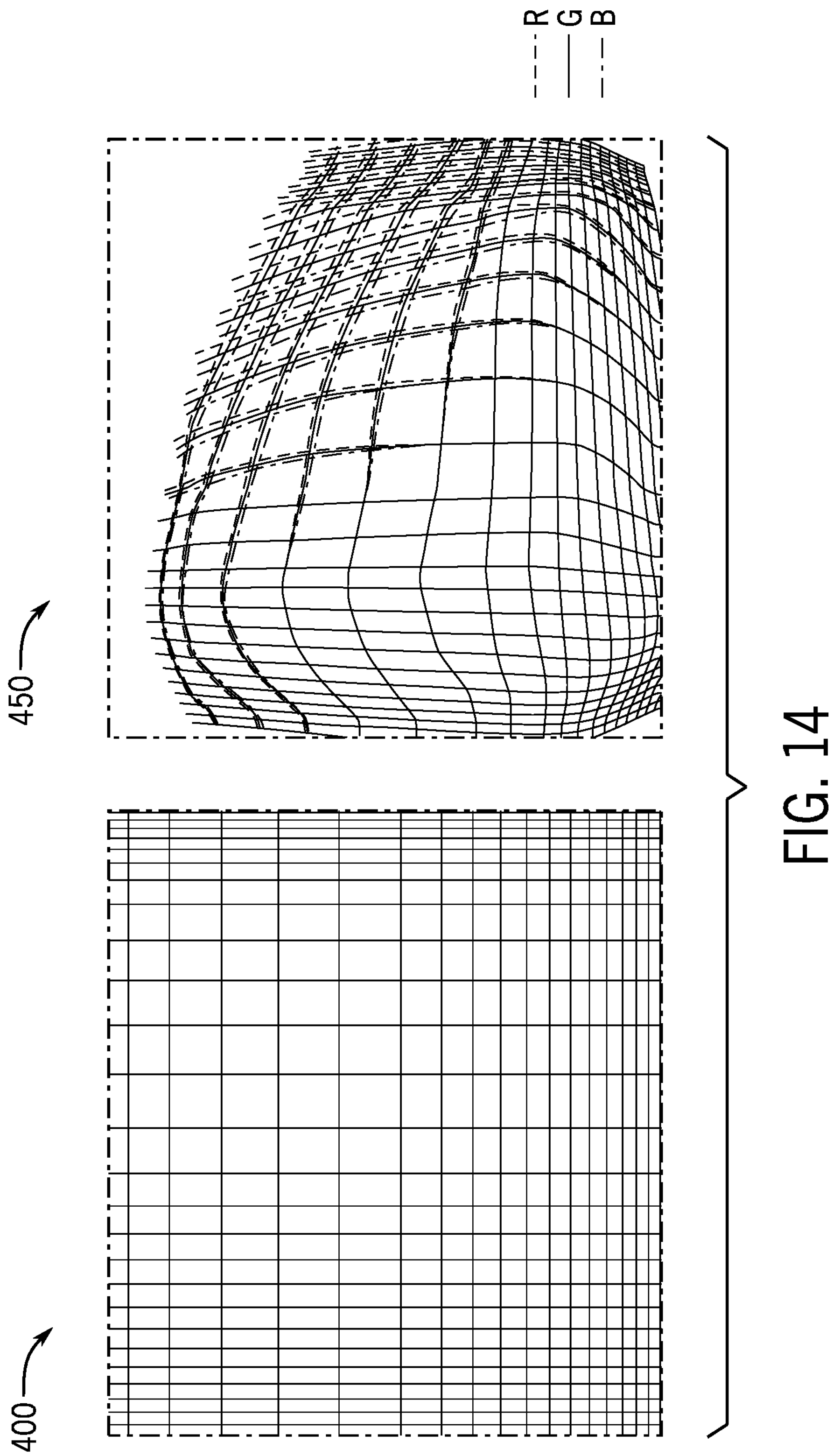
FIG. 14 shows an input image and a CAC corrected image, according to embodiments of the present disclosure.

FIG. 14 shows an input image 400 in a grouped space (e.g., foveated display) and a chromatic aberrations corrected image 450 after the CAC block 53 for the input image 400. The input image 400, when displayed (e.g., on a display panel or in a viewer's eye) without correction, may have distortions due to different display scenarios and/or input image characteristics, and the distortions may be color dependent. The corrected image 450 may be processed to account for the distortions as well as the chromatic aberrations. Accordingly, the corrected image 450, when displayed (e.g., on a display panel or in a viewer's eye), may have no or reduced distortions.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform] ing [a function] . . . " or "step for [perform] ing [a function] . . . ," it is intended that such elements are to be interpreted under 35 U.S.C. 112 (f). However, for any claims containing elements designated in any other manner, it is intended that such elements are not to be interpreted under 35 U.S.C. 112 (f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. An electronic device comprising:

an electronic display comprising a plurality of pixels and configured to display an image frame at a plurality of resolutions, wherein the image frame is divided into a plurality of adjustable regions having respective resolutions of the plurality of resolutions; and image processing circuitry, configured to generate chromatic aberration corrected image data, comprising:

warp circuitry configured to generate respective warped image data for each of the plurality of adjustable regions using corresponding portion of a first color component of input image data of the image frame based on a first distortion of the first color component; and chromatic aberration correction (CAC) circuitry configured to apply spatial resampling to the corresponding portion of a second color component of the input image data to compensate a second distortion of the second color component based on a first difference between the second distortion and the first distortion, wherein the first difference between the second distortion and the first distortion comprises a first offset along a first direction on the electronic display and a second offset along a second direction on the electronic display, wherein the chromatic aberration correction circuitry comprises a separable warp architecture comprising:

a first mapping circuit configured to apply spatial resampling to the corresponding portion of the second color component of the input image data based on the first offset; and a second mapping circuit configured to apply spatial resampling to the corresponding portion of the second color component of the input image data based on the second offset, wherein the first mapping circuit operates separately from the second mapping circuit.

2. The electronic device of claim 1, wherein the first color component is a green component.

3. The electronic device of claim 1, wherein the image processing circuitry is configured to generate corresponding chromatic aberration corrected image data for every frame to be displayed on the electronic display.

4. The electronic device of claim 1, wherein the image processing circuitry is configured to generate the chromatic aberration corrected image data based on operations comprising:

applying spatial resampling to the corresponding portion of a third color component of the input image data to compensate a third distortion of the third color component based on a second difference between the third distortion and the first distortion, wherein the third distortion associated with displaying the third color component of the input image data on the electronic display.

5. The electronic device of claim 4, wherein the first difference and the second difference are different.

6. The electronic device of claim 1, wherein the CAC circuitry comprises one or more offset grid buffers to store the first offset and the second offset.

7. An electronic device, comprising:

an electronic display configured to display an input image frame; and chromatic aberration correction (CAC) circuitry configured to generate chromatic aberration corrected image data of the input image frame based on operations comprising:

receiving warped input image data of the input image frame, wherein the warped input image data are generated, via warp circuitry, from input image data of the input image frame to compensate for a first distortion of a first color component of the input image data; and applying spatial resampling to a second color component of the input image data to compensate for a second distortion of the second color component based on a first difference between the second distortion and the first distortion, wherein the first difference between the second distortion and the first distortion comprises a first offset along a first direction on the electronic display and a second offset along a second direction on the electronic display, wherein the CAC circuitry comprises a separable warp architecture comprising:

a first mapping circuit for applying a first spatial resampling to the second color component of the input image data based on the first offset; and a second mapping circuit for applying a second spatial resampling to the second color component of the input image data based on the second offset. wherein the first mapping circuit operates separately from the second mapping circuit.

8. The electronic device of claim 7, wherein the CAC circuitry is configured to generate the chromatic aberration corrected image data based on operations comprising:

applying spatial resampling to a third color component of the input image data to compensate for a third distortion of the third color component based on a second difference between the third distortion and the first distortion, wherein the third distortion is associated with displaying the third color component of the input image data on the electronic display.

9. The electronic device of claim 8, wherein the first difference and the second difference are different.

10. The electronic device of claim 7, wherein the CAC circuitry comprises one or more offset grid buffers to store the first offset and the second offset.

11. The electronic device of claim 7, wherein the CAC circuitry comprises one or more delay buffers to delay the first color component of the input image data so that the first color component of the input image data is output with the spatially resampled second color component.

12. The electronic device of claim 7, wherein the first color component is a green component.

13. The electronic device of claim 7, wherein the CAC circuitry configured to generate the chromatic aberration corrected image data for every frame to be displayed on the electronic display.

14. A method implemented by image processing circuitry, comprising:

generating, via warp circuitry of the image processing circuitry, warped image data for an image frame to be displayed on an electronic display using a first color component of input image data of the image frame based on a first distortion of the first color component; and applying, via chromatic aberration correction (CAC) circuitry of the image processing circuitry, a spatial resampling to a second color component of the input image data to compensate a second distortion of the second color component based on a first difference between the second distortion and the first distortion, wherein the first difference between the second distortion and the first distortion comprises a first offset along a first direction on the electronic display and a second offset along a second direction on the electronic display, wherein the CAC circuitry comprises a separable warp architecture comprising:

a first mapping circuit for applying a first spatial resampling to the second color component of the input image data based on the first offset; and a second mapping circuit for applying a second spatial resampling to the second color component of the input image data based on the second offset, wherein the first mapping circuit operates separately from the second mapping circuit.

15. The method of claim 14, comprising:

applying a third spatial resampling to a third color component of the input image data to compensate a third distortion of the third color component based on a second difference between the third distortion and the first distortion, wherein the third distortion associated with displaying the third color component of the input image data on the electronic display.

16. The method of claim 15, comprising:

delaying the first color component of the input image data so that the first color component of the input image data is output with the spatially resampled second color component and the spatially resampled third color component.

17. The method of claim 16, comprising:

displaying the first color component with the spatially resampled second color component and the spatially resampled third color component on the electronic display.

18. The method of claim 15, wherein the first difference and the second difference are different.

19. The method of claim 14, wherein the first color component comprises a green color component.

20. The method of claim 14, wherein the CAC circuitry comprises one or more offset grid buffers to store the first offset and the second offset.

* * * * *